INJECTION/BLOW MOULDING MACHINE

Filed Feb. 9, 1970 10 Sheets-Sheet 1

INVENTORS
MICHAEL G. THORN
WILLIAM G. BRACKENRIDGE

BY Cullen, Settle, Sloman & Cantor
ATTORNEYS

Oct. 5, 1971 M. G. THORN ET AL 3,609,802

INJECTION/BLOW MOULDING MACHINE

Filed Feb. 9, 1970 10 Sheets-Sheet 2

INVENTORS
MICHAEL G. THORN
WILLIAM G. BRACKENRIDGE

BY Cullen, Settle, Sloman & Cantor

ATTORNEYS

INJECTION/BLOW MOULDING MACHINE

Filed Feb. 9, 1970 10 Sheets-Sheet 3

INVENTORS
MICHAEL G. THORN
WILLIAM G. BRACKENRIDGE
BY Cullen, Settle, Sloman & Cantor
ATTORNEYS Oct. 5, 1971 M. G. THORN ET AL 3,609,802

INJECTION/BLOW MOULDING MACHINE

Filed Feb. 9, 1970 10 Sheets-Sheet 4

INVENTORS
MICHAEL G. THORN
WILLIAM G. BRACKENRIDGE

BY Cullen, Settle, Sloman & Cantor

ATTORNEYS

INVENTORS
MICHAEL G. THORN
WILLIAM G. BRACKENRIDGE
BY Cullen, Settle, Sloman & Cantor
ATTORNEYS INVENTORS
MICHAEL G. THORN
WILLIAM G. BRACKENRIDGE
BY Sullen, Settle, Sloman & Cantor
ATTORNEYS INVENTORS
MICHAEL G. THORN
WILLIAM G. BRACKENRIDGE
BY Sullen, Settle, Sloman & Cantor
ATTORNEYS

INJECTION/BLOW MOULDING MACHINE

INVENTORS
MICHAEL G. THORN
WILLIAM G. BRACKENRIDGE
BY Cullen, Settle, Sloman & Cantor
ATTORNEYS INVENTORS
MICHAEL G. THORN
WILLIAM G. BRACKENRIDGE
BY Cullen, Settle, Sloman & Cantor
ATTORNEYS

INVENTORS
MICHAEL G. THORN
WILLIAM G. BRACKENRIDGE

BY Cullen, Settle, Sloman & Cantor
ATTORNEYS

United States Patent Office 3,609,802 Patented Oct. 5, 1971

3,609,802

INJECTION/BLOW MOULDING MACHINE

Michael G. Thorn and William G. Brackenridge, both of Canbury Works, Lower Ham Road, Kingston-on-Thames, Surrey, England Filed Feb. 9, 1970, Ser. No. 9,826
Claims priority, application Great Britain, Aug. 25, 1969, 42,239/69
Int. Cl. B29d 23/03
U.S. Cl. 18—5 BJ 11 Claims

ABSTRACT OF THE DISCLOSURE

The present invention relates to an injection/blow moulding machine in which a transfer of the parison sticks respectively of the injection mould and a blow mould, is effected by a simultaneous switching of the parison sticks between the two moulds. The simultaneous switching is achieved by connecting the parison sticks to carriers which pass along a track; the track between the injection mould and each blow mould being branched to form a closed loop guarded by points or track switches to permit the simultaneous passage of carriers therealong in opposite directions. When this operation is completed, the parison sticks transferred are disconnected from the carriers so that the transfer mechanism is left free to effect a like transfer between the injection mould and a further blow mould.

The present invention relates to an injection/blow moulding machine and to a transfer mechanism of such machine.

There is provided by the present invention an injection/blow moulding machine having a plurality of blow moulds served by an injection mould, the transfer mechanism comprising:

(a) For each of the moulds, a parison-stick transporting member having means for connecting the member with and disconnecting the member from a parison stick;

(b) Carriage means for each of the parison-stick transporting members;

(c) Support structure for supporting the carriage means of each parison-stick transporting member so that, by translational movement of each carriage means on the support structure, each parison-stick transporting member can be passed between a first position in which it is positioned to be connected with and to be disconnected from a parison-stick of the injection mould and a second position in which it is positioned to be connected with and to be disconnected from a parison stick of one of the blow moulds; and (d) Operating means for effecting a transfer of a parison-stick transporting member from the injection mould to each of the blow moulds in turn and of another parison-stick transporting member from each blow mould in turn to the injection mould, by a simultaneous operation first to connect the parison-stick transporting members concerned with the parison-sticks of the injection mould and of the blow mould concerned respectively, then to transfer the two members by translational movement thereof and then to disconnect the two members from their respective parison-sticks so that the transfer mechanism is left free to undertake a transfer between the injection mould and a further one of the blow moulds.

Each carriage means may comprise a bogie and the support structure, a track on which the bogies run. The track preferably surmounts the moulds; and in one embodiment of the present invention, the track is branched between the injection mould and each blow mould to form a closed loop to permit simultaneous passage of two parison-stick transporting members in opposite directions, and the operating means comprise a set of points for each loop to direct oppositely moving parison-stick transporting members approaching a loop respectively to the opposite limbs thereof.

The operating means may comprise a rack drive for the parison-stick transporting members, the rack drive being such that separate racks are provided for driving a parison-stick transporting member respectively in the opposite directions of travel on the supporting means; and the motion of a rack may be transmitted to a parison-stick transporting member by a finger carried by the rack to abut against the member or a part secured thereto.

The moulds may consist of two blow moulds and an injection mould with the two blow moulds arranged with the injection mould set centrally therebetween. With this arrangement of moulds, a rack drive may be employed comprising a single pair of racks for driving the parison-stick transporting members, one rack for driving the parison-stick transporting members in one direction between the injection mould and each blow mould and one rack for driving the members in the opposite direction between the injection mould and each blow mould; and the single pair of racks may be driven by a common cog-wheel meshing with the racks.

The operating means may further comprise movable, resilient steps movable to a position to engage each carriage means of the parison-stick transporting members taking part in any transfer operation to terminate the translational movement thereof.

It is preferred in the present invention to employ two-part moulds of the type in which one part is fixed and one part is movable, and in an embodiment of the present invention employing such moulds, the operating means comprise means for effecting movement of a parison-stick to be connected with or disconnected from a parison-stick transporting member so that after a mould is opened and before connection with a parison-stick transporting member, the parison stick is moved away from and clear of the fixed mould part and so that before a mould is closed and following disconnection from a parison-stick transporting member, the parison stick is moved to the fixed part of the mould to assume the position it occupies when the mould is closed.

To effect movement of the working parts of the transfer mechanism, the operating means may employ valve controlled, fluid-pressure piston and cylinder devices; and in one embodiment of the present invention, the control valves of the piston and cylinder devices are actuated by an arrangement of magnetically operated, electrical, limit-position switches such that each following movement in the sequence of movements effected by the transfer mechanism is initiated automatically at the termination of the last preceding movement; and each switch is one operated or actuated by a magnet with the switch and the magnet being located respectively on relatively moving parts of the transfer mechanism.

A presently preferred embodiment of the present invention will now be described, by way of example, with reference to the accompanying drawings, in which.

The machine illustrated in the accompanying drawings is generally conventional apart from the transfer mechanism and in view of this, the machine otherwise will be described only to the extent necessary clearly to illustrate the nature of the transfer mechanism.

Figure 9:
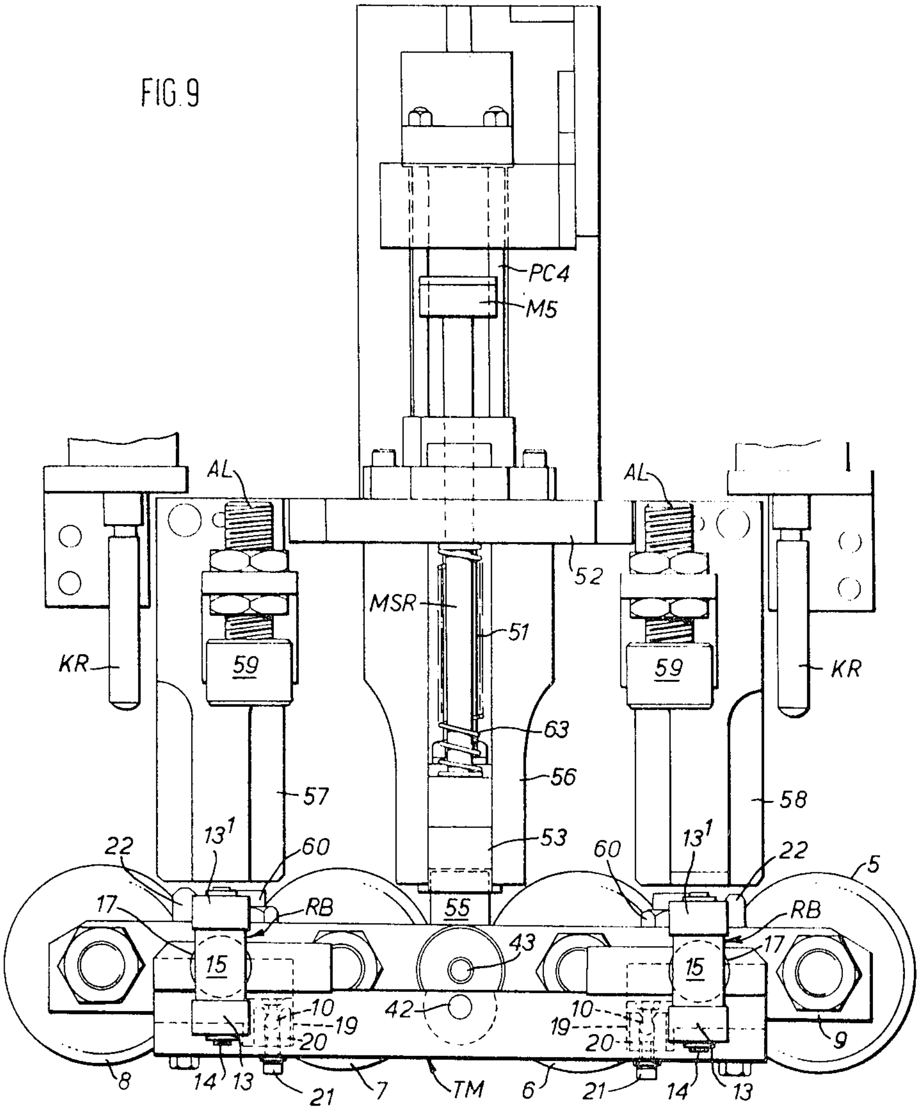
FIG. 9 is a plan view of a fragment of the transfer mechanism at a blow mould station with parts shown in outline to reveal underlying structure.
Figure 10:
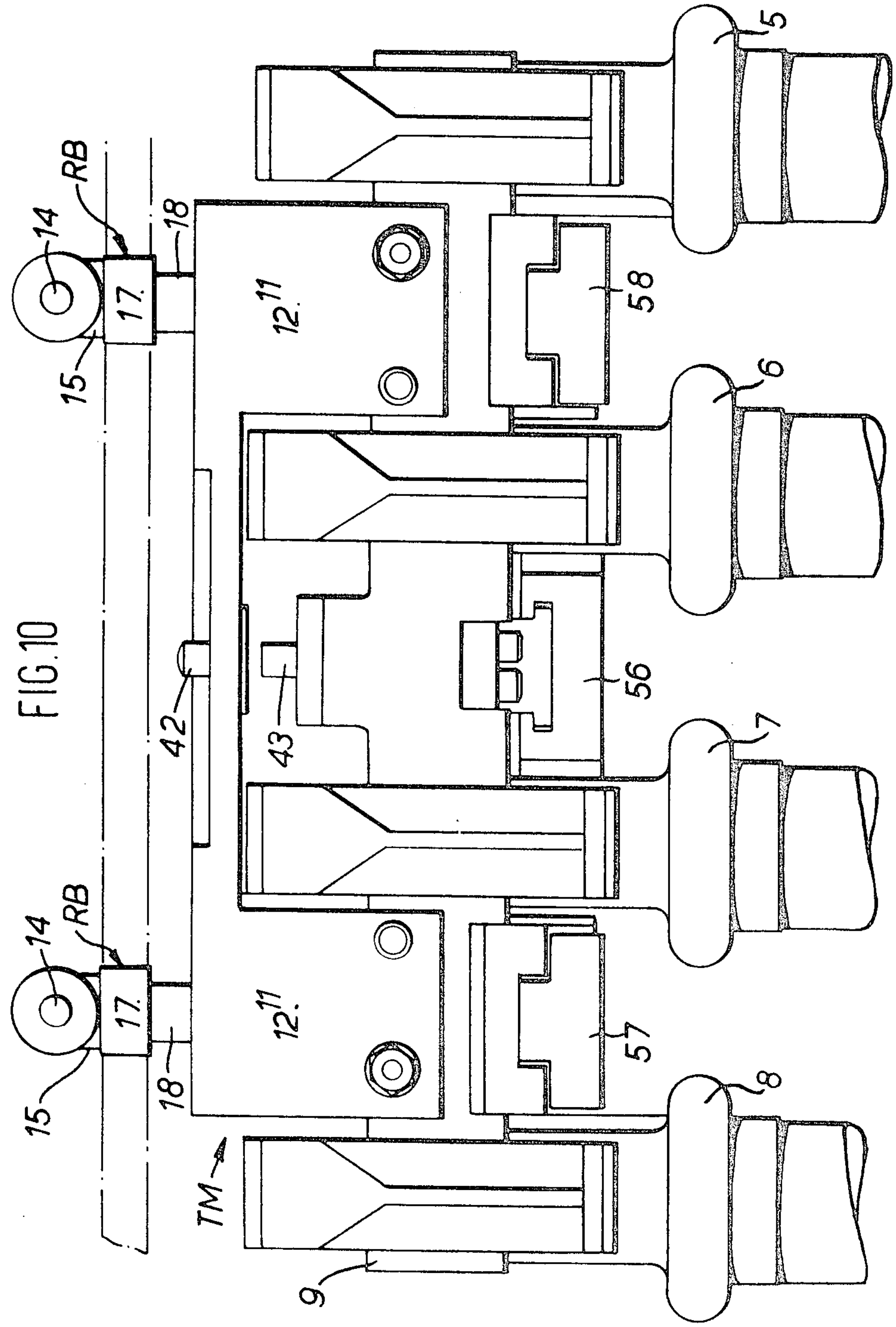
FIG. 10 is an elevation in the direction of arrow A of FIG. 9.
Figure 11:
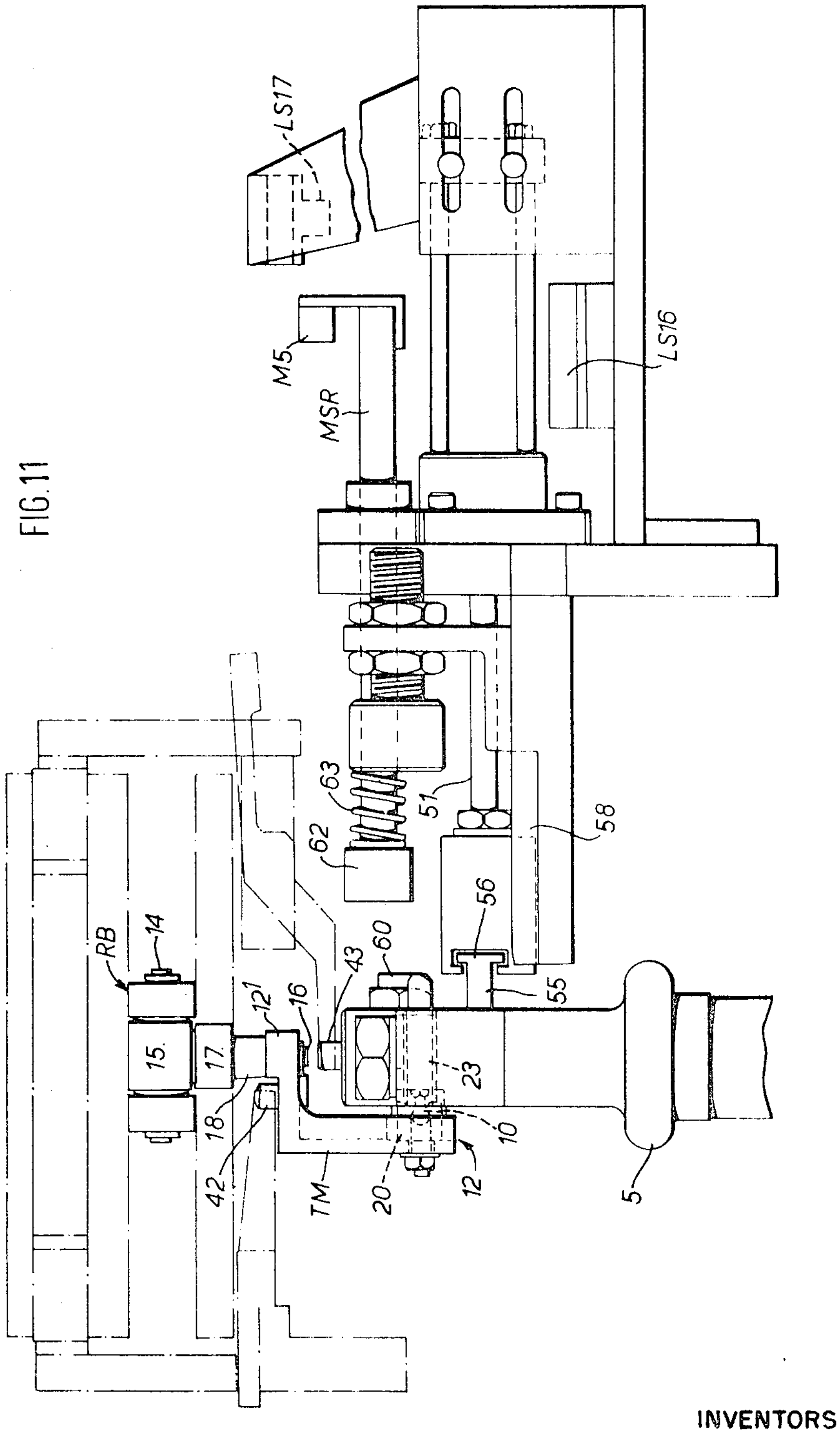
FIG. 11 is a side elevation of the fragment shown in FIG. 9.
Figure 12:
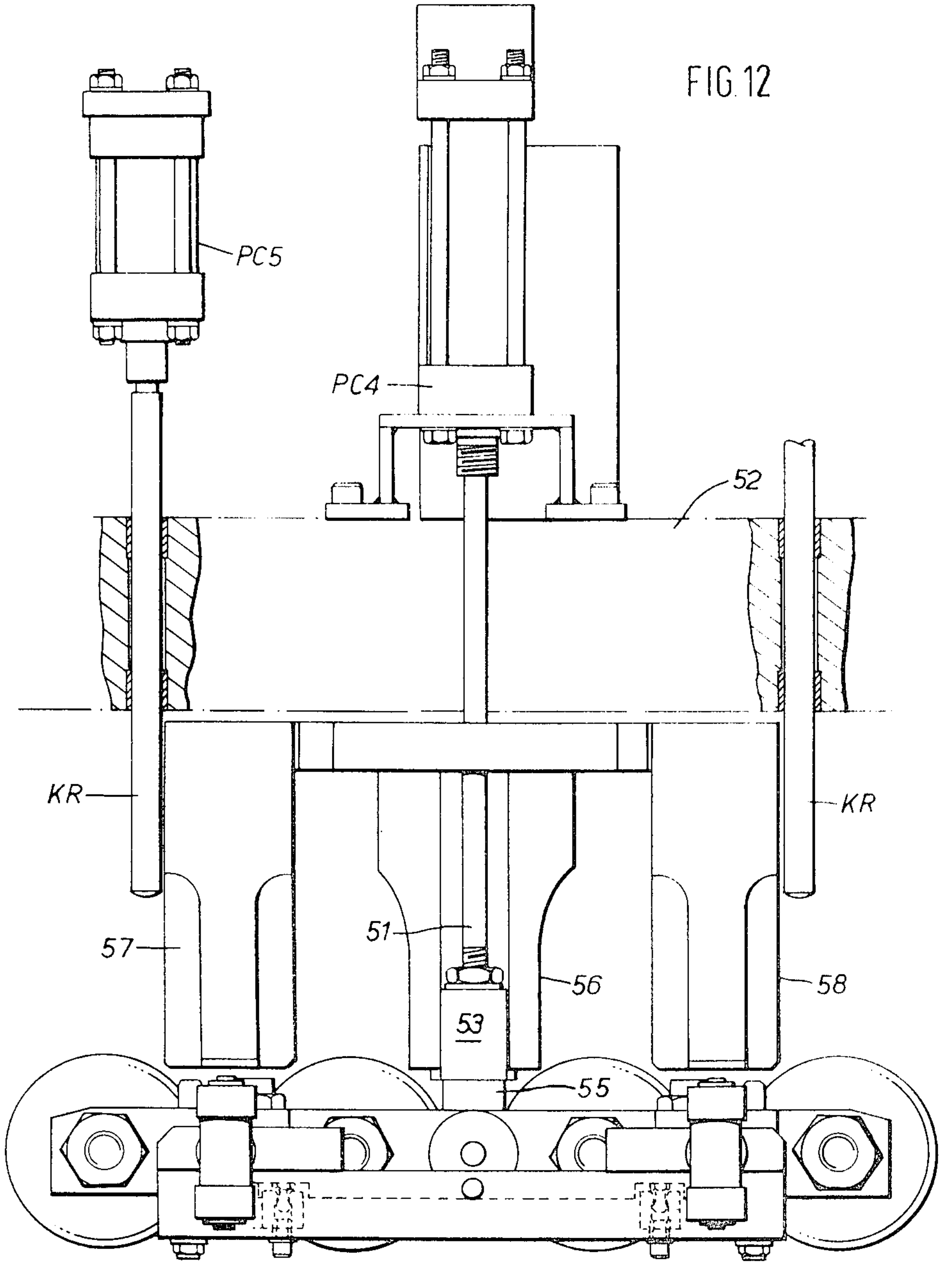
FIG. 12 is a like view to FIG. 9 but at the injection mould station and with parts omitted.
Figure 13:
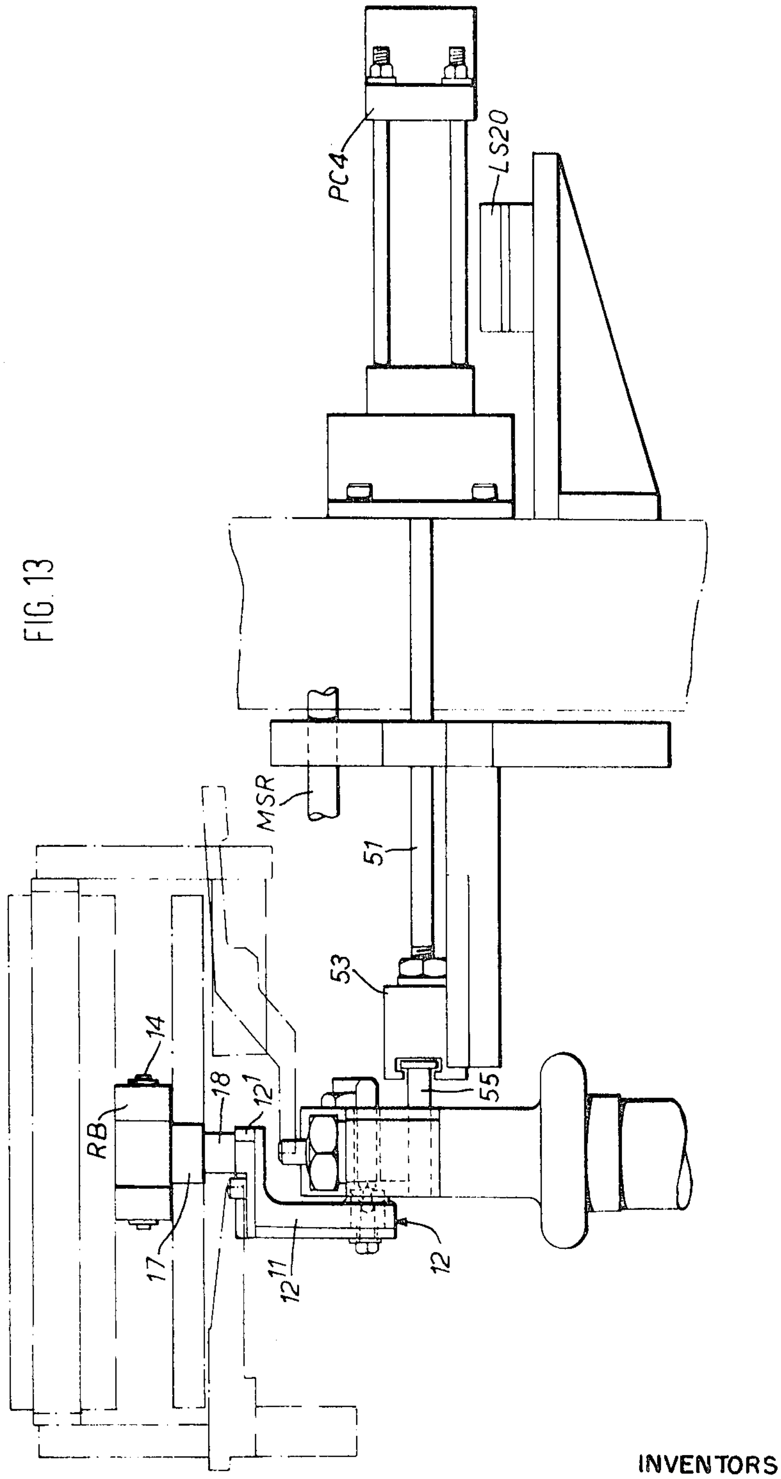
FIG. 13 is a like view to FIG. 10 but at the injection mould station and with the same parts omitted as FIG. 12.

The moulds (FIG. 1) are two-part moulds having a fixed part 1 secured to a fixed platen 2, and a movable part 3 secured to a movable platen 4, and consists of two blow moulds BM1, BM2 and an injection mould IM set in alignment transversely of the machine with the injection mould placed centrally between the two blow moulds. Each mould receives four parison sticks 5, 6, 7, 8 (FIGS. 9 to 12) fixed in a holder 9 and each holder carries two projecting clip pins 10 (indicated in outline in FIG. 9) by which the holder is connected with a parison-stick transporting member.

Figure 1:
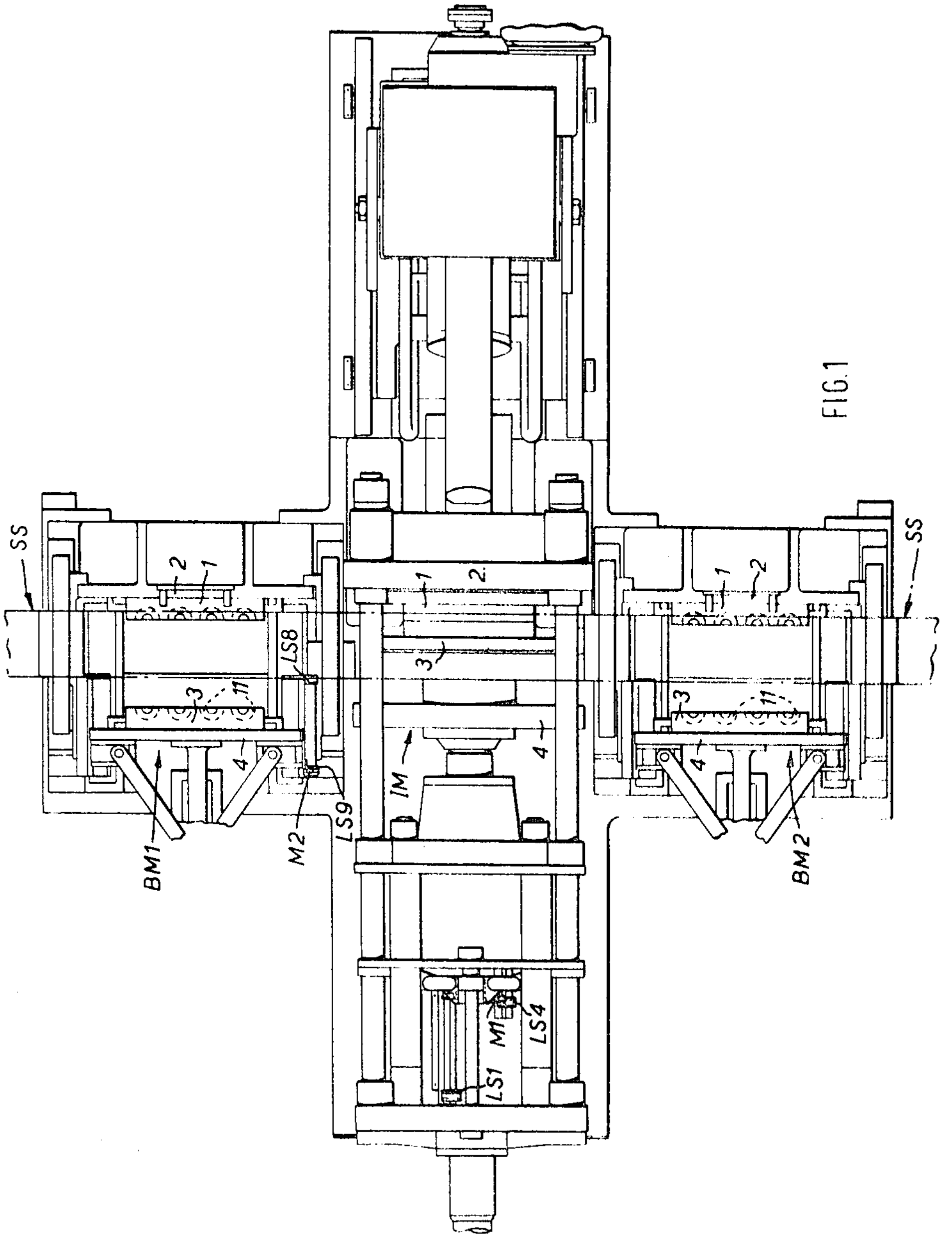
FIG. 1 is a plan view of the machine of the embodiment with the transfer mechanism indicated only in outline in order to show underlying sturcture.

The transfer mechanism comprises a number of parison-stick transporting members TM equal to the number of moulds, viz: three, and a support structure on which the members TM are supported and which comprises uprights (not shown) arising from the machine bed supporting beams 24 carrying a span SS passing transversely of the machine above the moulds as indicated in FIG. 1 so that the parison-stick transporting members can be positioned at the moulds respectively and translated between the moulds. The transfer mechanism operates following the opening of the injection mould and a blow mould, first to move the parison-stick holders holding the parison sticks of the two moulds away from and clear of the fixed part of the moulds and then to connect the two holders with respective parison-stick transporting members positioned at the moulds, then following ejection of the articles formed on the parison sticks of the blow mould, simultaneously to translate the two parison-stick transporting members concerned, that is, to move one from the blow mould concerned to the injection mould and the other from the injection mould to the blow mould concerned, and then disconnect the holders from the respective parison-stick transporting members to move them towards the fixed part of the moulds and place the parison sticks carried by the holders in the position they occupy when the moulds are closed; the position being indicated by the mould cavities 11 of fixed part of the blow moulds as shown in FIG. 1. The moulds are then closed and subsequently, following opening of the injection mould again and the other blow mould, a like transfer is effected between these moulds using the parison-stick transporting member now positioned at the injection mould and the parison-stick transporting member positioned at the other blow mould. The above cycle of operations is then repeated in the continued operation of the machine.

Each of the parison-stick transporting members TM, one of which is seen in FIGS. 9 to 12, comprises an L-shaped plate 12 one flange 12' of which bears a pair of roller bogies RB constituting the carriage means of the parison-stick transporting members. Each bogie comprises a pair of rollers 13, 13' which are mounted on a shaft 14 supported in a carriage block 15. Each carriage block is mounted on a shaft 16 (FIG. 11) secured to flange 12'; and the shaft 16 also carries a needle roller bearing 17 spaced from flange 12' by a spacer 18. The other flange 12'' of each parison-stick transporting member bears two recessed bores 19 each housing a grip 20, for example, of nylon, held in place by a screw 21, and two pegs 22 extending laterally away from the flange 12'' on the side towards the fixed mould halves. The two grips 20 receive therein the two clip pins 10 respectively of a parison-stick holder firmly to grip the pins and prevent relative movement between the parison-stick transporting member and the parison-stick holder during a transfer operation while the two pegs 22 pass through respective bores 25 (FIG. 11) in the parison-stick holder to act as rigid supports for the holder on the parison-stick transporting member. The pegs also act as guides for a parison-stick holder in the movement of the latter to connect it to and disconnect it from a parison-stick carrying member, as will be more fully explained hereinbelow.

Figure 4:
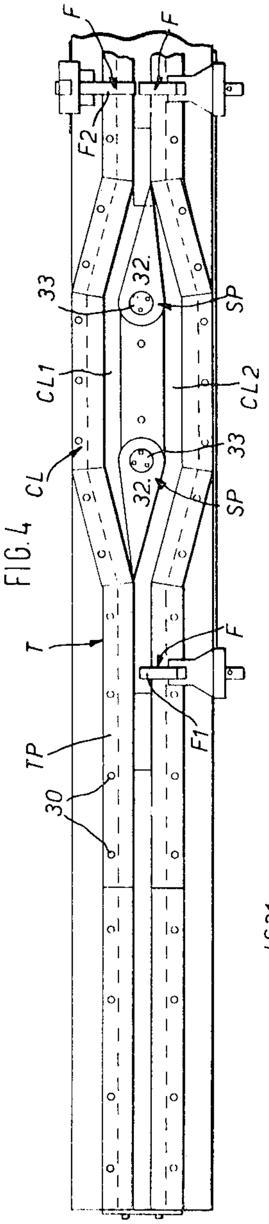
FIG. 4 is a plan view from below of part of a track indicated in FIGS. 2 and 3.
Figure 5:
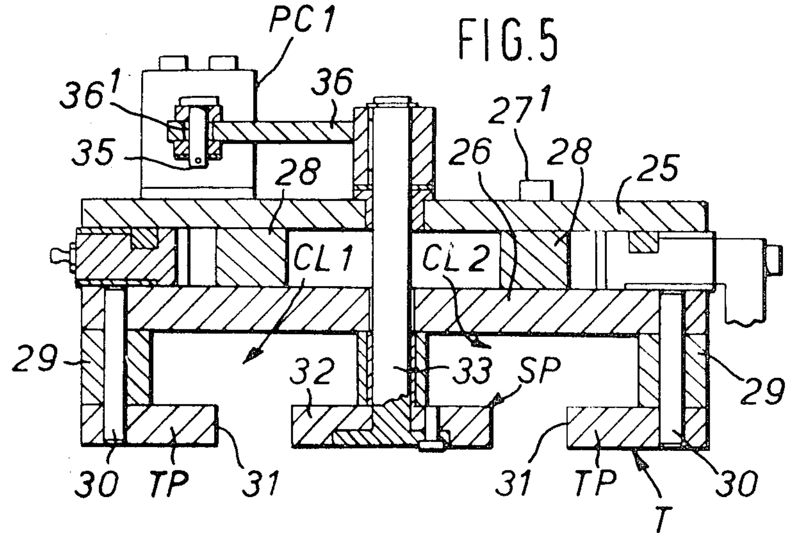
FIG. 5 is a section on the line A—A of FIG. 2.

The span SS of the support structure (FIGS. 2 to 6) comprises an upper plate 25 and a lower plate 26, suspended from the beams 24 by bolts 27, and spaced apart by spacers 28 carried on the shanks of the bolts 27 and further bolts 27'. A track T on which the bogies of a parison-stick transporting member run, is formed on the lower plate 26 by a series of plates TP and spacer bars 29 carried to depend from the lower plate 26 by screws 30 so that the plates TP form the track surface on which the rollers 13, 13' run while the spacer bars act as guides for those rollers, and the inwardly directed lateral edges 31 of plates TP act as guides for the cylindrical bearings 17 carried on the respective shafts 16 of the bogies. The track between the injection mould and each blow mould is branched to form a closed loop CL (FIG. 4) guarded by points or switch sets SP. Each set of points comprises a track member 32 set fast on a vertical shaft 33 so that by rotation of the shaft, the member can be turned to alternative positions to close off one or the other of the opposite limbs CL1, CL2 of the loop to permit oppositely travelling carriage means first to enter the respective limbs by setting of the track members in one direction, and then to leave the respective limbs by switching of the track members to the alternative position. Thus, two parison-stick transporting members can be switched in a simultaneous operation between the injection mould and a blow mould. The switching of a track member 32 is effected by the bogies of a parison-stick transporting member and, after the bogies have passed, the track member is automatically returned to its first position so that one limb of a track loop is always used for movement of a parison-stick transporting member in one direction and the other limb of the track loop is always used for movement thereof in the opposite direction. The return of a track member is effected by a spring-loaded piston housed in a cylinder PC1, the spring (not shown) being compressed in the switching of the track member so that when the bogies have cleared the track member, the piston is returned by the spring, and thereby returns the track member. Each piston acts through a piston rod 34; and movement is transmitted between a piston rod 34 and a shaft 33 by a link arm 36 pivotally connected at one end to the piston rod by pin 35 and made fast at the other end with the shaft 33. In transmitting motion between the piston rod 34 and a shaft 33, the link arm undergoes an arcuate movement and to allow for this, the bore in the link arm through which the pin 35 passes is made in the form of a slot 36' passing transversely of the axis of the piston rod (FIG. 5) to permit the requisite lateral displacement of the link arm with respect to piston rod to take place as the radial distance between the shaft 33 and the piston rod varies (see FIG. 5).

Figure 6:
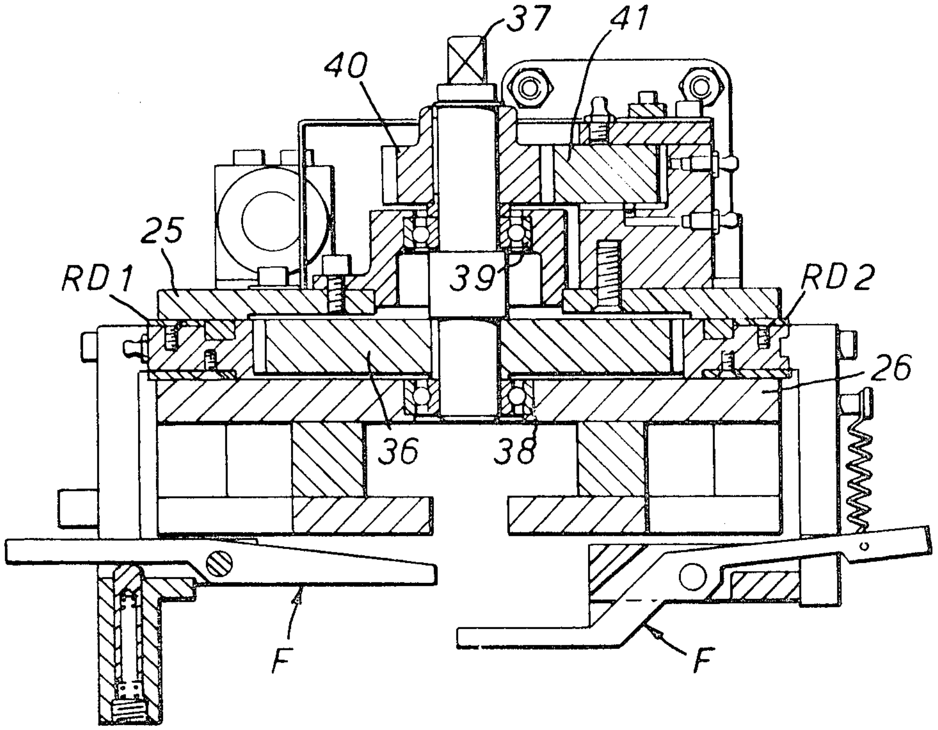
FIG. 6 is a section on the line B—B of FIG. 2.

The parison-stick transporting members are translated along the span of the support structure by means of a rack drive. For effecting the translational movement of the parison-stick transporting members, the rack drive comprises a single pair of racks RD1, RD2 (FIG. 6)

operated by a common cog wheel 36 so that rotation of the latter drives the two racks simultaneously but in opposite directions. The common cog wheel is mounted on a vertical shaft 57 carried in ball bearings 38, 39; and the shaft 37 has mounted fast thereon a gear wheel 40 meshing with a further rack 41 serving to transmit motion from a piston and cylinder device PC2 to the gear wheel. The device PC2 is double acting and reciprocates the transmission rack 41 so that each two successive strokes of the device PC2 translates each of the drive racks RD1, RD2 from a first to a second extreme position of travel and then from the second to the first extreme position of travel. When in one of the two extreme positions of travel, rack RD1 extends between one of the blow moulds and the injection mould and rack RD2 extends between the other of the blow moulds and the injection mould while in the other of the two extreme positions of travel, rack RD1 extends between the other of the blow moulds and the injection mould and rack RD2 extends between the one blow mould and the injection mould. Each drive rack near each end bears a finger F (FIGS. 1 to 8) but the two fingers of rack RD1 are somewhat more closely spaced than are the two fingers of rack RD2. The reason for the disparate spacing will be made clear below. As may be seen from FIG. 6, the fingers of rack RD1 lie, at their extremities lying inwardly of the track, at a higher level than the fingers of rack RD2 at the like extremities thereof and, for convenience, the fingers of rack RD1 may be called high-level fingers and the fingers of rack RD2, low-level fingers. The positioning of the fingers on the racks is such that assuming the racks are stationed in extreme positions of travel, one of the high-level fingers abuts against a spigot 42 (see FIG. 10 in particular) carried by a parison-stick transporting member positioned at the injection mould, with the spigot lying between the finger and the blow mould to which the parison-stick transporting member is next to be delivered while one of the low-level fingers abuts against a spigot 43 of a parison-stick holder, when the holder is secured to a parison-stick transporting member positioned at said blow mould, with the spigot lying between the finger and the injection mould. The above-described positioning of the fingers will be apparent from FIG. 4 in which the left hand (low-level) finger F1 may be regarded as the one abutting against a spigot 43 and the right hand (high-level) finger F2 as the one abutting against a spigot 42. It will be seen that in moving the drive racks from the extreme position of travel shown in FIG. 4 so that the other extreme position of travel, because of the abutment of the above-mentioned fingers against the respective spigots, the parison-stick transporting member at the injection mould will be pushed on its bogies to the blow mould, assumed to be open, lying on the left of the injection mould (as viewed in FIG. 1) while the parison-stick transporting member at that blow mould will be pushed on its bogies to the injection mould. In this operation, there is no obstruction of the other finger of each of the two racks RD1, RD2. At the start of the operation, the other finger of each rack will be unobstructed since the other (high-level) finger of rack RD1 will be moving away from the spigot 42 of the parison-stick transporting member positioned at the other blow mould while the other (low-level) finger of rack RD2 will be moving away from the spigot 43 of th holder holding the parison sticks of the injection mould. At the termination of the operation, the other finger of rack RD2 is unobstructed since it is approaching the other blow mould when the parison stick holder is located thereabove and, therefore, out of the line of movement of the finger. In this connection it will be recalled that when one blow mould is open, the other blow mould is closed. In the case of the other finger of rack RD1, it may be noted from FIG. 4 that a limb of a branch loop of the track, takes a parison-stick transporting member along a path which leaves the spigot 42 of the member displaced laterally from the line of the unbranched portion of the track at a mould station; and the length of a branch loop is such that the spigot 42 is not brought into alignment with the end portion of a finger against which it abuts until the translational movement of the parison-stick transporting member approaching the injection mould is almost terminated. Further, as mentioned above, the high-level fingers are more closely spaced than the low-level fingers and consequently, the other (high-level) finger of rack RD1 passes the station, the spigot 42 assumes on termination of the movement of the parison-stick transporting member, before the spigot reaches that station. Thus, the other (high-level) finger of rack RD1 reaches the termination of its movement without obstruction.

Since the parison-stick transporting members are pushed by the fingers of the drive racks, it is necessary to provide means to terminate their movement, and, for this purpose, the span of the support structure has mounted thereon four identical, movable stops LHS, CS2 and RHS respectively. Each stop is let into the support structure through apertures in the upper plate 25 and the lower plate 26 respectively and each comprises a spring-loaded stop member 44 (FIGS. 7 and 8) carried in a guide block 44' and held therein by a socket set screw 45. The guide block 44' also has secured thereto by screws 46 a further block 47 into which is screwed the exposed end of the piston rod of a pneumatic piston and cylinder device PC3 so that by movement of the piston rod, the stop member can be raised from and lowered to the position, which may be called the working position, shown in FIGS. 7 and 8 in which it is aligned with the carriage block of a bogie running on the track. The rod block 47 is supported against a plate 48 secured to a bracket 49 carried by the top plate 25 of the support structure. The plate 48 also rigidly carries the cylinder of the device PC3. The two stops LHS and RHS are located to flank the blow mould (see FIGS. 2 and 3) and the two stops CS1, CS2 are located to flank the injection mould so that when the stop members are in their working position, each encounters the leading bogie of a parison-stick transporting member approaching the stop somewhat before the terminal position of the bogie, to brake the parison-stick transporting member to a stop at the terminal position.

The two stops CS1, CS2 are operated alternately so that in any given transfer operation, the one of the two stops is operated which is on the side of the injection mould remote from the blow mould to and from which parison sticks are being transferred. The other two stops are left with their stop members in the working position throughout the machine operation although in any given transfer operation, only one of them, namely, the one flanking the blow mould to and from which parison-sticks are being transferred, acts to brake a parison-stick transporting member.

It will be realised from the above that the devices PC3 of the stops LHS, RHS are to enable the stop members thereof to be raised clear of the track in order to provide access thereto for insertion and removal of the bogies of a parison-stick transporting member. Likewise, the fingers F of the racks are spring-loaded as shown in FIG. 6 to enable the fingers to be raised to clear the respective spigots.

Figure 8:
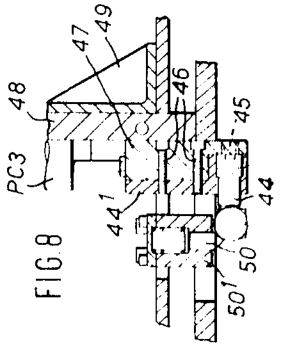
FIG. 8 is a section on the line X—X of FIG. 2.
Figure 7:
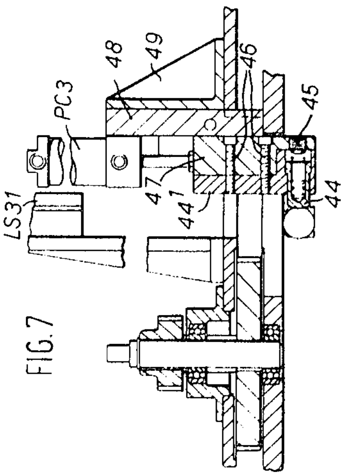
FIG. 7 is a section on the line Y—Y of FIG. 2.

It is desirable in operation of the machine to ensure that the stationary parison-stick transporting member, i.e. the one positioned at the closed blow mould, is not moved from its position due to vibration or jogging from moving parts of the machine. In order to prevent such movement, a spring-loaded catch member 50 (FIG. 8) housed in a casing 50' is provided located in front of each of the stops LHS, RHS so that the catch member, after being pushed upwardly by a carriage block advancing to the stop member, descends to bear against the trailing top edge of the carriage block when the carriage block has been braked to a halt by the stop member, as shown in FIG. 8, so that the carriage block is trapped and held between the catch member 50 and the stop member 44.

For the purpose of moving a parison-stick holder to and from the fixed part of a mould, each mould has centrally located thereabove, a piston rod 51 (FIGS. 9 to 12) passing through a support plate 52, of a pneumatic piston and cylinder device PC4. Each rod carries a head block 55 having a channel-shaped recess 54 (FIG. 11) taken in from its face, to engage with a projecting lug 55 of a parison-stick holder, the projecting end 56 of which is of complementary shape to the recess 54 of a head block 53. The projecting end of a lug 55 of a parison-stick holder engages with a recess 54 on arrival of the parison-stick holder at a mould station by an endwise sliding movement into the recess and disengages from the recess by a like but opposite movement on departure of the holder from a mould station. In the movement of a rod 51, the head block thereof is guided on a centrally disposed guide plate 56 carried by support plate 52 and similarly a parison-stick holder undergoing movement by the rod is guided by two lateral guide plates 57, 58 also carried by the support plate.

Following engagement of the projecting end of a lug 55 of a parison-stick holder with the recess of a head block 53, retraction of the piston of the device PC4 at the mould concerned, first separates the parison-stick holder from the parison-stick transporting member positioned at the mould by sliding the holder along the pegs 22 to cause the clip rings 10 to be withdrawn from the grips 20, and then continues the movement of the holder from the pegs 22 onto the guide plates 57, 58 until the parison-sticks carried by the holder assume the position they occupy during moulding, i.e. when the mould is closed. Extension of the piston of the device PC4 from the retracted position, then reverses the above movement to re-connect the holder with the parison-stick transporting member. Following opening of the injection mould and a blow mould, the parison-sticks of the injection mould will be carrying parisons or "preforms" of the articles to be blow-moulded and the parison-sticks of the blow mould will be carrying blown articles, and to cause a uniform separation of the parisons and the blown articles from the respective fixed mould parts, a pair of kicker rods KR are provided at each mould, operated by respective piston and cylinder devices PC5 (FIG. 12) to provide additional but uniform impetus to the parison-stick holders initially in the reverse movement thereof.

At each blow mould a pair of airlines AL is provided to pass air to the parison sticks enclosed in the mould; each airline having a terminal connector 59 to engage with one of a pair of air-inlet nozzles 60 for the parison sticks, carried on each parison stick holder.

The parison mould is opened and closed by a hydraulic piston and cylinder device PC6 and each blow mould is opened and closed by a pneumatic piston and cylinder device PC7. A further pneumatic piston and cylinder device PC2 is arranged vertically at each blow mould to underlie the mould for operating an injector to eject blown articles formed on the parison sticks in the mould. The ejector comprises a set of fingers (not shown) which is raised so that when the holder of the parison sticks from a blow mould is connected to the respective parison-stick transporting member, a finger passes between each two adjacent parison sticks somewhat above the position of the formed articles and two fingers flank the end parison sticks respectively of the holder. The set of fingers is then moved downwardly to below the blow mould to push the blown articles from the parison sticks.

Figure 2:
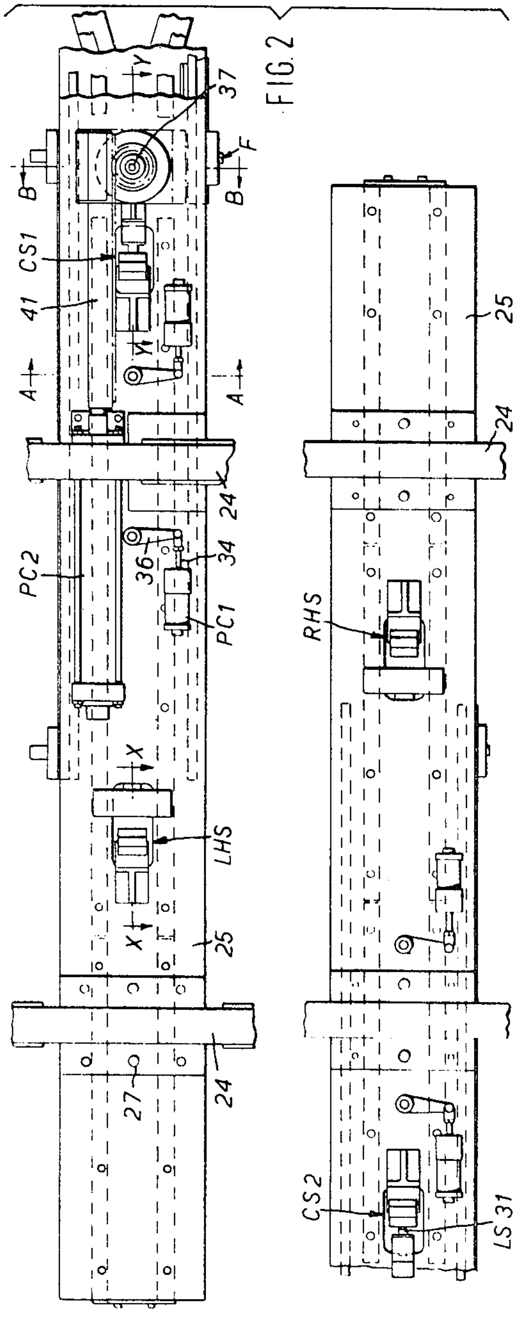
FIG. 2 is a plan view of the transfer mechanism.
Figure 14:
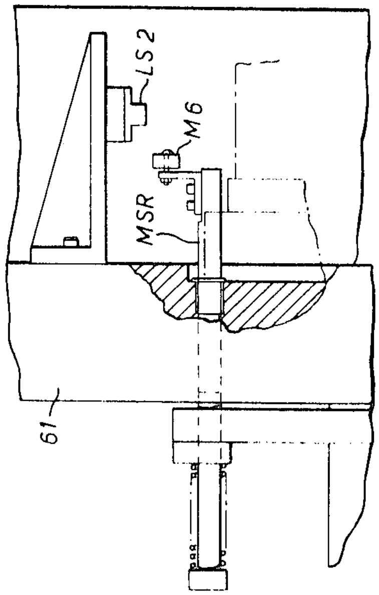
FIG. 14 is an elevation of the parts omitted from FIG. 12.
Figure 3:
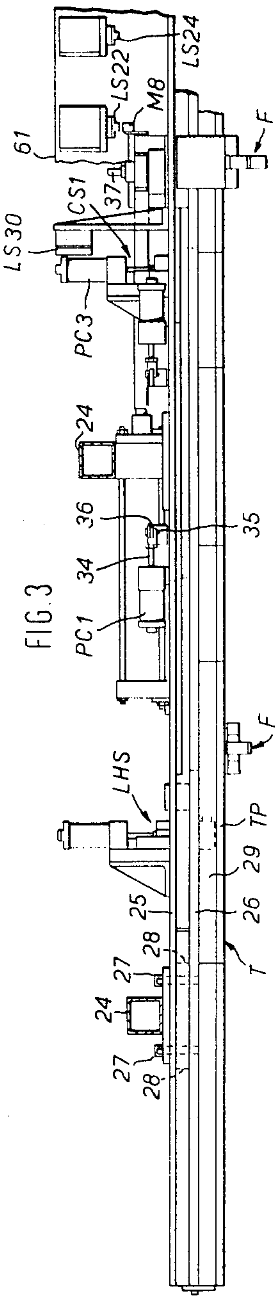
FIG. 3 is a side elevation of part of the transfer mechanism shown in FIG. 2.
Figure 15:
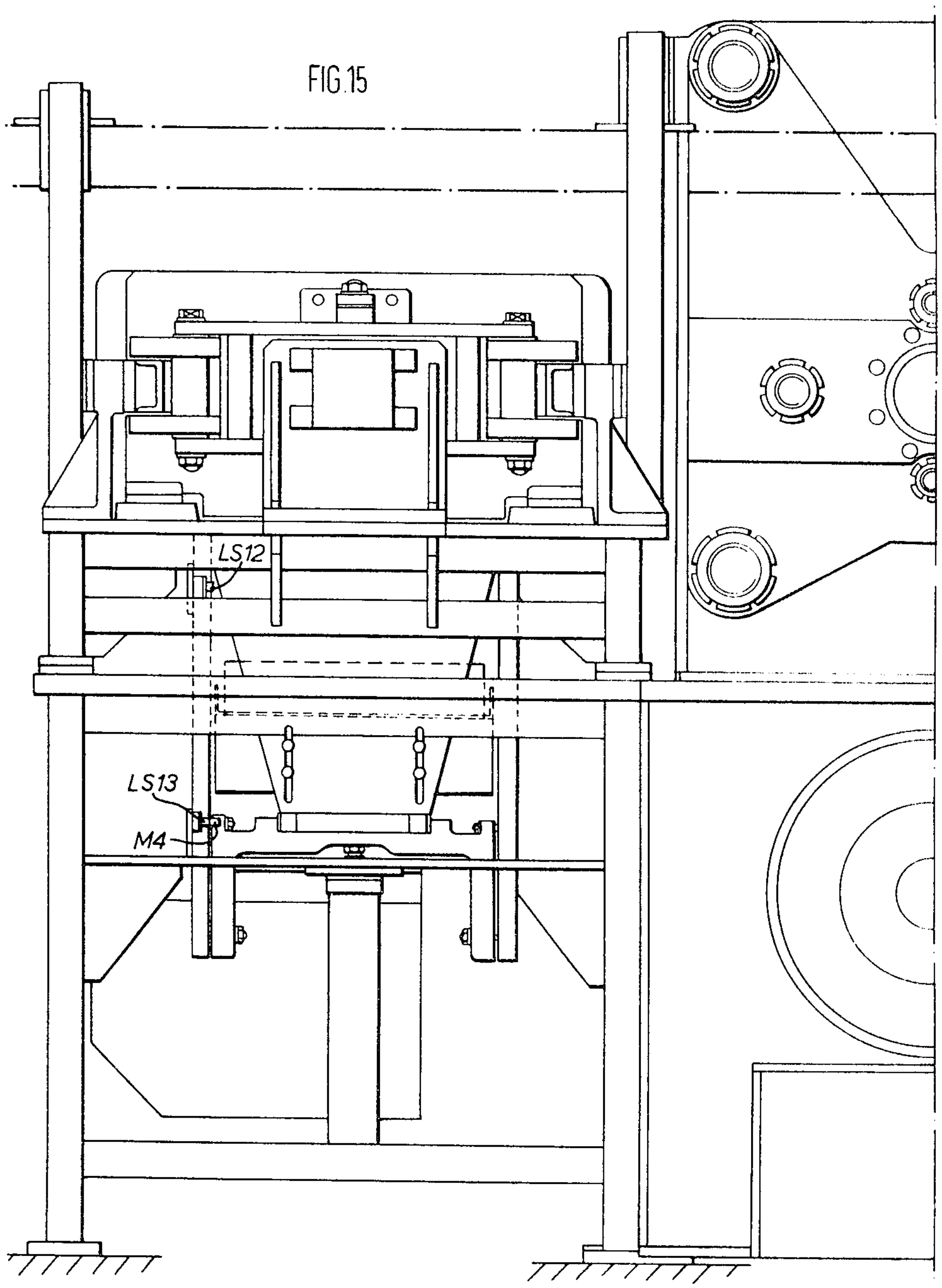
FIG. 15 is an end elevation of the machine at the left-hand blow mould station.

The various pneumatic and hydraulic piston and cylinder devices employed are conrrolled by valves (not shown) actuated by an arrangement of electrical, limit-position switches such that each following movement in the sequence of movements effected by the transfer mechanism, is initiated automatically at the termination of the last preceding movement. The following switches are provided:

LS4 (FIG. 1)—operated when parison mould closed;
LS8 (FIG. 1)—operated when left-hand blow mould closed;
LS9—(FIG. 1)—operated when left-hand blow mould fully open;
LS10 (not shown but positioned in the like manner on the right-hand side of the machine as LS8 is on the left hand)—operated when right-hand blow mould closes;
LS11 (not shown but positioned in the like manner on the right-hand side of the machine as LS9 is on the left hand)—operated when right-hand blow mould is fully opened;
LS12 (FIG. 15)—operated when ejector of left-hand blow mould in raised position;
LS14 (not shown but positioned on right hand of the machine in the like manner as LS12 is on the left hand)—operated when the ejector of right-hand blow mould is in the raised position;
LS16 (FIG. 11)—operated when the piston and cylinder device PC4 at the left-hand blow mould is fully extended;
LS17 (FIG. 11)—operated when the parison sticks of the left-hand blow mould are positioned in the mould;
LS18 and 19 (not shown but positioned on the right-hand of the machine and operated in the like manner as LS16 and 17 respectively are on the left-hand of the machine);
LS20 (FIG. 12)—operated when the piston and cylinder device PC4 at the injection (parison) mould is fully extended;
LS21 (FIG. 14)—operated when the parison sticks of the injection mould are positioned in the mould;
LS22 (FIGS. 2 and 3)—secured to a bolster plate 61 and operated when piston and cylinder device PC2 of transmission rack 41 is retracted as shown in FIGS. 2 and 3;
LS23 (not shown but mounted on right-hand of machine to be operated when piston and cylinder device PC2 is fully extended);
LS24 (FIG. 2)—operated during movement of transmission rack 41.

Each of the switches other than LS16, 18, 20 is a reed-switch comprising contacts operated by a magnet; the switches being located on fixed parts of the machine and the magnets on moving parts thereof so that at the termination of the movement of each moving part as specified above, the magnet secured to the moving part is brought closely adjacent to the contacts of the respective switch to cause operation thereof. Switches LS16, 18 and 20 are operated by magnetic induction. For this purpose, each switch comprises a coil, located within the cylinder of the respective piston and cylinder device, in which current is induced by a magnet carried by the piston of the device, when the piston terminates its stroke in the given direction. To avoid unnecessary illustration, the coils and magnets are not shown. Likewise to avoid unnecessary illustration, the magnets located on the right-hand side of the machine are not shown but they are located on any given moving part in the like manner to the magnets located on the left-hand side of the machine. The latter magnets are as follows:

M1 (FIG. 1)—for operating switches LS4;
M2 (FIG. 1)—for operating switches LS8 and 9;
M4 (FIG. 15)—for operating switches LS12;
M5 (FIG. 11)—for operating switch LS17;
M6 (FIG. 14)—for operating switch LS21;
M8 (FIGS. 1 and 2)—for operating switches LS22, 23 and 24.

It may be seen from FIGS. 9 to 13 that magnets M5 and M6 are carried at the end of a sliding rod MSR remote from that facing the track. Each rod bears a head portion 62 and has mounted between the head portion and the support plate 52, a compression spring 63, so that the rod is fully extended towards the track when the spring is expanded. Each rod is positioned so that a parison-stick transporting member moving toward the fixed part of a mould, encounters the head portion of the rod and displaces the rod axially until when the parison sticks carried by the holder are positioned in the mould, the magnet carried by the rod is positioned closely adjacent to the respective switch to cause operation thereof. In this displacement of a rod MSR, the spring 63 is compressed and as a result, the rod is self-returning on withdrawal of the parison sticks from the mould, i.e. the rod is returned to its original position by the expansion of the spring.

It may also be mentioned that opening of the blow moulds on the one hand and of the injection mould on the other hand results from the operation of separate timers which determine respectively the period of the blow mould cycle and the period of the injection mould cycle.

A typical operation of the machine is shown in the table herein in which movements initiated simultaneously are listed under the same cardinal number; it being assured that initially all the moulds are closed:

| | Part moved | Switch operated | Effect |
|---|---|---|---|
| 1 | Left hand blow mould opened. | LS9 | Closed circuit to actuate valve of device PC8 of l.h. ejector. |
| 2 | L.h. ejector raised | LS12 | Actuates valve of device PC4 of rod 51 of l.h. blow mould. |
| 3 | Rod 51 of l.h. blow mould fully extended. | LS16 | Actuates valve of device PC8 of l.h. ejector. |
| 4 | L.h. ejector lowered | | |
| 5 | Injection mould starts to open and PC4 extends. | | |
| 6 | Rod 51 of device PC4 at injection mould station fully extended. | LS20 | Actuates valve of device PC3 to withdraw l.h and r.h. centre stops, and actuates valve of device PC2 of rack drive. |
| 7 | Racks RD1 and RD2 transferred. | LS24 (first) | Actuates valve of device PC3 of r.h. centre stop. |
| | | LS22 | Actuates valve of device PC4 of the l.h. blow mould and the injection mould. |
| 8A | R.h. centre stop lowered before rack transfer completed. | | |
| B | Rod MSR of l.h. blow mould retracted. | LS17 | Actuates valve of device PC7 of l.h. blow mould. |
| C | Rod MSR of injection mould retracted. | LS21 | Actuates valve of device PC6 of injection mould. |
| 9A | L.h. blow mould closed. | LS8 | Starts action of timer for setting period of the blow mould closed, |
| B | Injection mould closed | LS4 | Starts action of timer for setting period of the injection mould closed. |
| 10 | Right hand blow mould open. | LS11 | Actuates valve of device PC8 of r.h. ejector. |
| 11 | R.h. ejector raised | LS14 | Actuates valve of device PC4 of r.h. blow mould. |
| 12 | Rod 51 of r.h. blow mould fully extended. | LS18 | Actuates valve of device PC8 of r.h. ejector. |
| 13 | R.h. ejector lowered | | |
| 14 | Injection mould starts to open and PC4 extends. | | |
| 15 | PC4 at injection mould station fully extended. | LS20 | Actuates valve of device PC3 to withdraw r.h. and l.h. centre stops and actuates valve of device PC2 of rack drive. |
| 16 | Racks RD1 and RD2 transferred. | LS24 (first) | Actuates valve of device PC3 of l.h. centre stop, |
| | | (then) LS23 | Actuates valve of device PC4 of r.h. blow mould and the injection mould. |
| 17A | L.h. centre stop lowered before rack transfer completed. | | |
| B | Rod of MSR of r.h. blow mould retracted. | LS19 | Actuates valve of device PC7 of r.h. blow mould. |
| C | Rod of MSR of injection mould retracted. | LS21 | Actuates valve of device PC6 of injection mould. |
| 18A | R.h. blow mould closed. | LS10 | Starts section of timer for setting period of the blow mould closed. |
| B | Injection mould closed | LS4 | Starts action of timer for setting period of the blow mould closed. |

We claim:

1. In an injection/blow moulding machine having a plurality of blow moulds served by an injection mould, the transfer mechanism comprising:

(a) for each of the moulds, a parison-stick transporting member having means for connecting the member with and disconnecting the member from a parison-stick;

(b) carriage means for each of the parison-stick transporting members;

(c) support structure for supporting the carriage means of each parison-stick transporting member so that, by translational movement of each carriage means on the support structure, each parison-stick transporting member can be passed between a first position in which it is positioned to be connected with and to be disconnected from a parison stick of the injection mould and a second position in which it is positioned to be connected with and to be disconnected from a parison stick of one of the blow moulds; and (d) operating means for effecting a transfer of a parison-stick transporting member from the injection mould to each of the blow moulds in turn and of another parison-stick transporting member from each blow mould in turn to the injection mould, by a simultaneous operation first to connect the parison-stick transporting members concerned with the parison sticks of the injection mould and of the blow mould concerned respectively, then to transfer the two members by translational movement thereof and then to disconnect the two members from their respective parison sticks so that the transfer mechanism is left free to undertake a transfer between the injection mould and a further one of the blow moulds.

2. A machine according to claim 1, wherein each carriage means comprise a bogie, and the support structure comprises a track on which run the bogies of the carriage means of the parison-stick transporting members.

3. A machine according to claim 2, wherein between the injection mould and each blow mould, the track is branched to form a closed loop to permit simultaneous passage of two parison-stick transporting members in opposite directions; and wherein the operating means comprise a set of points for each loop to direct oppositely moving parison-stick transporting members approaching a loop respectively to the opposite limbs thereof.

4. A machine according to claim 1, wherein the track surmounts the moulds.

5. A machine according to claim 1, wherein the operating means comprise a rack drive for the parison-stick transporting members, the rack drive being such that separate racks are provided for driving a parison-stick transporting member respectively in the opposite directions of travel on the supporting means.

6. A machine according to claim 5, wherein the motion of a rack is transmitted to a parison-stick transporting member by a finger carried by the rack.

7. A machine according to claim 5, wherein two blow moulds are provided and arranged with the injection mould set centrally therebetween; and wherein the rack drive comprises a single pair of racks for driving the parison-stick transporting members, one rack for driving the parison-stick transporting members in one direction between the injection mould and each blow mould and one rack for driving the members in the opposite direction between the injection mould and each blow mould.

8. A machine according to claim 7, wherein the pair of racks are driven by a common cog-wheel meshing with the racks.

9. A machine according to claim 7, wherein the operating means comprise moulds, resilient stops movable to engage each carriage means of the parison-stick transporting members in each transfer operation to terminate the translational movement thereof.

10. A machine according to claim 1, wherein each of the moulds is a two-part mould of the type in which one part is fixed and the other part is movable; and wherein the operating means comprise means for effecting movement of a parison-stick to be connected with or disconnected from a parison-stick transporting member so that after a mould is opened and before connection with the parison-stick transporting member, the parison-stick is moved away from and clear of the fixed mould part, and so that before a mould is closed and following disconnection from a parison-stick transporting member, the parison stick is moved to the fixed part of the mould to assume the position it occupies when the mould is closed.

11. A machine according to claim 1, wherein, to provide motive power for the moving parts, the operating means comprise valve-controlled, fluid-pressure piston and cylinder devices the control valves of which are actuated so that in the sequential operations of the transfer mechanism, each following operation in the sequence is initiated by operation of a control valve in response to the termination of the last preceding operation; and wherein the operating means comprise, for actuating the control valve, magnetically operated electrical, limit-position switches; the switches each being operated by a coil and a magnet located respectively on relatively moving parts of the transfer mechanism.

References Cited

UNITED STATES PATENTS

| | | | |
|---|---|---|---|
| 3,116,516 | 1/1964 | Moslo | 18—5 BJ |
| 3,340,569 | 9/1967 | Hagen | 18—5 BP |

H. A. KILBY, Jr., Primary Examiner

U.S. Cl. X.R.

18—5 BP